United States Patent [19]

Hess

[11] Patent Number: 4,862,921

[45] Date of Patent: Sep. 5, 1989

[54] AIR DISTRIBUTION SYSTEM FOR AIR SUPPORT CONVALESCENT BEDS

[76] Inventor: Jack Hess, 15455 Ella Blvd., Houston, Tex. 77090

[21] Appl. No.: 226,429

[22] Filed: Jul. 29, 1988

[51] Int. Cl.[4] ............................................. F16K 13/00

[52] U.S. Cl. ......................................... 137/861; 5/456

[58] Field of Search ................ 137/861; 251/205, 118; 5/455, 456

[56] References Cited

U.S. PATENT DOCUMENTS

| | | | |
|---|---|---|---|
| 945,234 | 1/1910 | Hinsdale | 5/456 |
| 1,105,090 | 7/1914 | Metzger | 251/205 X |
| 3,784,994 | 1/1974 | Kery | 5/456 |
| 4,448,228 | 5/1984 | Hashimoto et al. | 5/450 X |

FOREIGN PATENT DOCUMENTS

| | | | |
|---|---|---|---|
| 2373996 | 7/1978 | France | 5/456 |

*Primary Examiner*—John Fox
*Attorney, Agent, or Firm*—James L. Jackson

[57] ABSTRACT

An air distribution manifold assembly for air support convalescent beds includes a rectangular housing adapted to be secured to a flat surface of the bed structure and cooperating therewith to form an air chamber. A plurality of air distribution connectors extend from respective walls of the housing and are each provided with fixed orifice elements that define orifices of predetermined dimension for distribution of pressurized air to respective air cells of an air bed system. The housing structure defines an outlet opening having a plurality of closely spaced, side-by-side outlet ports that are controllably closed by a slide valve for controlling venting of pressurized air from the air chamber. The slide valve is electrically driven by a rack and pinion assembly and is selectively operable by the patient for adjusting the supply of pressurized air to the air cells to control the firmness of the air support bed. Adjustable limit switches actuated by the slide valve control the respective maximum open and closed positions of the slide valve and thus the maximum firmness or softness conditions of the air bed.

20 Claims, 2 Drawing Sheets

AIR DISTRIBUTION SYSTEM FOR AIR SUPPORT CONVALESCENT BEDS

FIELD OF THE INVENTION

This invention is related generally to air support convalescent beds such as are typically employed in hospitals, nursing homes and in the home care environment for the protection of bed ridden patients from the development of pressure lesions, commonly referred to as bed sores. More specifically the present invention is directed to an air distribution system for air support convalescent beds having a present air supply relationship for individual air cells or groups of air cells of such air beds and wherein the overall pressure relationships of the air cells for the general firmness or softness is adjustable by the patient or others for the benefit of the patient's comfort.

BACKGROUND OF THE INVENTION

All air support convalescent beds have an air supply system to transfer pressurized air from an air supply to the individual air cells of the bed system. Typically the air supply or air supply manifold is in communication with a plurality of conduits extending from the air supply or manifold to the individual air cells or groups of air cells. In most cases each of the air supply conduits is provided with a control valve that may be manipulated for adjusting the pressure in individual air cells according to the needs of the patient. Typically these valves are provided at a location that is inaccessible by the patient such that the patient cannot efficiently control the air supply for purposes of comfort. In some cases, multiple valves for the air distribution conduits are located in a secure enclosure that is accessible only by nursing personnel, thus insuring that the patient's medical needs may be closely controlled and monitored to insure the desired standard of treatment for any particular patient.

In other cases the air supply system itself is variable thereby allowing nursing personnel or those servicing the air bed system to control the pressure and volume of air being supplied to the bed in order to maintain the various regions of the bed structure within predetermined pressure ranges to thereby satisfy prescribed medical conditions for convalescence of individual patients. Under circumstances where patients or those in attendance with the patients have access to pressure and volume controls for air support convalescent beds it is well known that the control system of the bed can easily get completely out of adjustment such that the needs of the patient for optimum support are not efficiently maintained. It is desirable therefore to provide a simplified air support convalescent bed system incorporating an air supply that may be simply and efficiently adjusted by the patient or by untrained persons in attendance with the patient for adjustment of the pressure and volume of air supply for the comfort of the patient. It is also desirable that an air support convalescent bed system be provided wherein the various regions of the air support bed are enabled to efficiently maintain a predetermined regional relationship as the air support bed is made more soft or firm by adjustment according to the needs of the patient's comfort. Even further, it is desirable to provide limits of the degree of firmness or softness of air support convalescent beds in order that efficient convalescing treatment of the patient may be effectively maintained even though the patient or others have the capability of adjusting the pressure and volume or air supplied to the air cells of the air bed system.

Accordingly, it is therefore a principal feature of the present invention to provide a novel air distribution system for air support convalescent beds that may be simply and efficiently adjusted by the patient or persons in attendance to the patient for controlling the firmness or softness of the air cells for the comfort and convalescing needs of the patient.

It is also a feature of this invention to provide a novel air supply system for air support convalescent beds wherein air distribution to individual air cells or groups of air cells is preset such that a predetermined pressure/volume relationship is always maintained regardless of pressure and volume adjustment that is accomplished by or for the patient.

It is an even further feature of this invention to provide a novel air distribution system for air support convalescent beds wherein pressurized air supply from a source of compressed air to an air distribution manifold is efficiently adjustable through operation of a single control valve.

It is also a feature of this invention to provide a novel air distribution system for air support convalescent beds incorporation a single control system for controlling the firmness or softness of the bed system which may be efficiently activated by the patient or those in attendance to the patient without the possibility of the air supply to individual air cells or groups of air cells getting out of adjustment.

It is an even further feature of this invention to provide a novel air distribution system for air support convalescent beds wherein the supply of air is adjustable between upper and lower limits to insure maintenance of the convalescent bed within a predetermined air pressure and volume range as prescribed for adequate convalescing treatment of the patient.

SUMMARY OF THE INVENTION

Air support convalescent beds that are especially intended for nursing home or home care use, according to the present invention, are provided with a single air supply manifold that is connected to the convalescent bed structure and forms an air distribution chamber. The air distribution manifold defines an inlet through which air is supplied under pressure from an air supply source such as an air blower, air compressor, hospital room air supply etc. Typically, for home care type air support convalescent beds the source of compressed air will be provided by an electrically driven, quiet air blower that is incorporated as a component part of the air bed structure.

From the air supply manifold extend a plurality of air discharge connections that are each adapted for connection with an air supply conduit extending from the air distribution manifold to respective ones of a plurality of air cells or groups of air cells that form the patient support surface of the air bed. Air is thus supplied under pressure into the manifold from the air blower or other suitable source and is then distributed via a plurality of conduits to the individual air cells or groups of air cells.

It is well known that differing regions of the air bed surface require differing pressures in order to provide adequate therapeutic support for the patient and to provide for the comfort of the patient. For example, the pelvic region of most patients requires a significantly higher pressure than those portions of the air bed that are designed for support of the lower legs and feet of the patient. Therefore, pressurized air supplied from the manifold to individual groups of air cells must be at differing pressures. This feature is accommodated by a plurality of fixed orifice devices that are defined by or disposed in the air discharge connections. These fixed orifices are of differing respective dimension according to those portions of the air bed structure to which the air is to be supplied. The orifice devices are removably retained within the air distribution connections, thus enabling the relationships of the air cells to be adjusted, for example to accommodate different patients or to provide changes in therapy. By maintaining a predetermined pressure within the air supply manifold and by providing various fixed orifices of differing dimension, the air being supplied to the respective air cells or groups of air cells will be of differing pressure. The size of the respective orifices is determined according to the particular physical characteristics and therapeutic needs of the patient. Once installed, obviously the fixed orifices maintain their particular dimensional relationships and thereby cause the pressure relationships of the air cells to be maintained even though the overall pressure of the air bed system may be adjusted. Changes in pressure to the various air cells of air cell groups can therefore occur only by changing the pressure and volume of air within to the manifold itself.

The control of air pressure within the manifold is adjusted by a valve forming a pressure control means at the outlet of the manifold. The outlet valve means may conveniently take the form of a single valve mechanism that may be efficiently adjusted under control of the patient or those in attendance with the patient for the purpose of adjusting the air pressure within the manifold and thus rendering the air cells more or less firm as desired for the patient's comfort and care. To provide a wide range of air pressure adjustment within the manifold the air outlet means may conveniently take the form of two or more air outlet openings arranged in closely spaced relation and the provision of a single slide valve that is movable through a considerable distance to open as much of one or more of the air outlet opening as desired for controlling the volume of air that is permitted to escape from the manifold. By controlling the volume of air escaping from the manifold, the air pressure within the manifold is controlled and thus the degree of firmness of the air support bed is also controlled. The slide valve may be efficiently operable by a simple rack and pinion system that is driven by a reversible electric motor having a single directional control switch that is controllable by the patient or by others. To insure that the supply of air to the air cells is maintained between predetermined minimum and maximum levels for the safety and comfort of the patient upper and lower pressure level limit switches are provided that are capable of actuation to de-energize the motor of the slide valve if the motor control is actuated beyond limits that are prescribed for efficient convalescence of the patient.

The valve and motor control system for controlling the firmness of the air bed system is located within the housing forming the air distribution manifold thereby insuring against contamination of the motor and valve system during use and further insuring that the patient or those in attendance with the patient cannot come into contact with the electrical system that is provided for operation of the air bed system.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
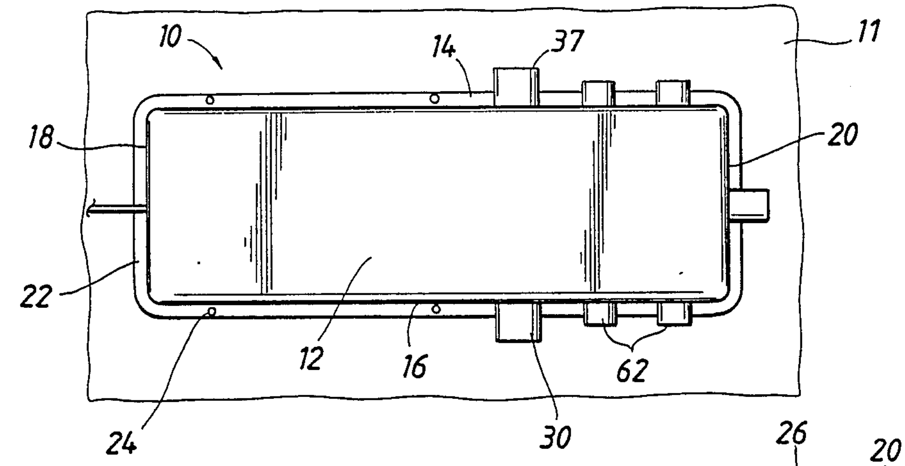
FIG. 1 is a bottom view of an air supply manifold assembly constructed in accordance with the present invention.
Figure 2:
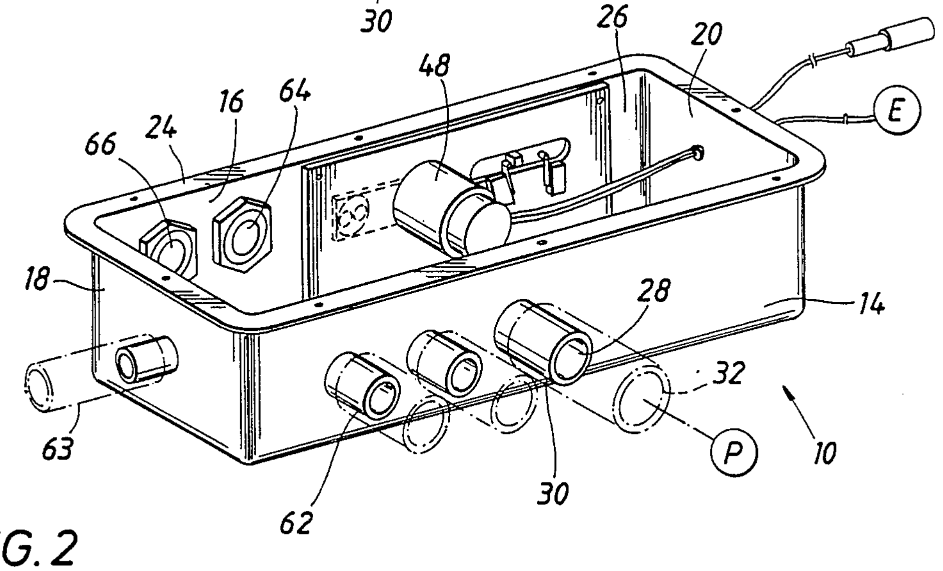
FIG. 2 is an isometric illustration of the air supply manifold assembly of FIG. 1 shown prior to assembly thereof to a plate of the air bed system to be controlled.

Referring now to the drawings and first to FIG. 1 an air supply system for an air support convalescent bed is provided with a manifold from which air is distributed to different air cells or air cell groups defined by a convalescent bed system. The air supply manifold may conveniently take the form shown in the figures wherein a generally rectangular housing is provided as shown generally at 10 which is supported by a flat panel 11 of a therapeutic air bed and defines a bottom wall 12, side walls 14 and 16 and end walls 18 and 20. From the upper ends of the side and end walls extends a horizontal flange 22 defining apertures 24 through which screws are extended for connection of the flange to any suitable flat surface 11 of the hospital bed such as a horizontal, under surface thereof. Typically, a sealing gasket will be employed between the flange 24 and the flat surface of the hospital bed to thereby insure a positive seal therebetween. When the housing structure 10 is in assembly with the flat surface of the hospital bed the interior of the housing forms a generally rectangular manifold chamber or air chamber 26. The side wall 16 of the manifold housing is formed to define an inlet opening 28 which is formed by a tubular inlet fitting 30 of sufficiently large dimension to provide the maximum volume of compressed air that can be utilized by the air bed system. The fitting 30 receives an air supply hose shown in broken lines at 22 for admission of pressurized air from a source, such as an air blower, P into the manifold chamber 26. For purposes of simplicity and to ensure the provision of a low cost convalescent air bed system, the air blower P will typically be a single speed non-adjustable air blower.

For control of the air pressure of the manifold chamber an outlet valve and valve control assembly shown generally at 38 is fixed by means of screws or by any other suitable means of support to the inside wall surface of side wall 16. The valve and valve control assembly incorporates a support plate 40 that provides support for an elongated slide valve or gate 42. The valve 42 controls the degree of opening of an air outlet which is shown in drawings, is defined by a pair of closely spaced air outlet ports 33 and 34. The valve 42 may, if desired, take the form of a ball valve or any other type of valve without departing from the spirit and scope of this invention. The slide valve is capable of reciprocation between a closed position where the slide valve covers all of both of the air outlet ports 33 and 34 and a fully open position where the slide valve is moved to a position permitting full flow of air from the manifold chamber 26 to the atmosphere or to any other type of receiver. The slide valve is used to control the air pressure in the manifold chamber 26 to thus control the volume and pressure of air being distributed to the air sacs of the air bed. The slide valve 42 is provided with a gear rack 44 along the upper edge thereof which is received in driven relation by means of a pinion gear 46 that is in turn driven by the output shaft of an electric motor 48. Preferably, the motor 48 is a reversible, direct current motor adapted for operation by a 12 volt direct current power system to which the drive and control circuitry 50 of the motor extends. The motor 48, being reversible, thereby allows the motor to control reciprocal movement of the slide valve 42 in either direction for opening or closing the outlet ports 33 and 34. It should be borne in mind that the provision of small inlet ports 33 and 34 rather than a single large port provides the valve control system with the capability of more accurately adjusting the flow of pressurized air being allowed to flow from the manifold chamber 26 than if a single large opening were employed. Obviously, the outlet opening or openings may conveniently take any other form that will enable efficient pressure control adjustment of pressurized air being vented from the manifold chamber. An outlet passage 35 is formed by an outlet tube 37 extending from the housing wall 16 and surrounding the outlet openings 33 and 34. A discharge tube 39 may be received by the outlet tube 37 to conduct vented air away from the housing structure 10.

To insure against over adjustment of the slide valve 42 in either the opening or closing direction and to permit medical personnel with the capability of insuring that the firmness of the air bed is maintained within a desired range, the drive motor system is provided with a mechanism for achieving motor cut off when the slide valve has been moved between prescribed limits. One suitable means for accomplishing such motor cut off may conveniently take the form of a pair of limit switches 52 and 54 which may be secured to the support plate 40 in the vicinity of the slide valve 42. A stop projection 56 extends from the slide valve and is disposed for engagement with respective ones of the limit switch arms 58 and 60 respectively. Thus, if a patient or another person is in the process of varying the supply of air into the manifold chamber for increasing or decreasing firmness of the air bed system, the circuitry of the drive motor will become automatically de-energized, thus stopping movement of the slide valve whenever the slide valve reaches either of it preset open or closed positions. The limit switches 52 and 54 are adjustable, thereby enabling the limit switch arms 58 and 60 to be positioned so as to automatically stop valve movement at positions selected by medical personnel. Typically, however, the limit switches will be preset at the factory within limits prescribed by the industry.

The valve and valve drive mechanism 38 is positioned inside the manifold chamber 26, thus providing for efficient protection of the valve and valve drive system during use. The limit switches 52 and 54 are also located inside the manifold chamber, thereby insuring that the limit switches are only capable of adjustment upon disassembly of the housing from the support panel of the air bed. This feature insures that once preset the air bed system will always be maintained within limits of prescribed by medical personnel for proper convalescence of the patient.

For distribution of pressurized air from the manifold chamber 26 to respective air cells or groups of air cells a plurality of air distribution connectors 62 project from respective side and end walls of the housing structure. Air distribution tubes or conduits such as shown at 63 will extend from the respective air distribution connectors to respective air cells or manifolds supplying air cells. Air flow through each of the air distribution connectors and tubes is controlled by means of respective orifice fittings 64 that are removably secured within respective receptacles or orifice seats defined by the air distribution connectors 62. Each of the orifice fittings 64 shown in greater detail in FIG. 5 will define an air supply orifice of predetermined dimension depending upon the air flow and pressure characteristics that are intended for individual regions of the air bed. After the orifice fittings have been installed, the relationships of the air cells of the air bed will always remain equivalent. The orifice fittings define tapered or diverging openings at the discharge side thereof for minimizing the noise of air flowing therethrough so that the air bed is of quiet operation.

Figure 5:
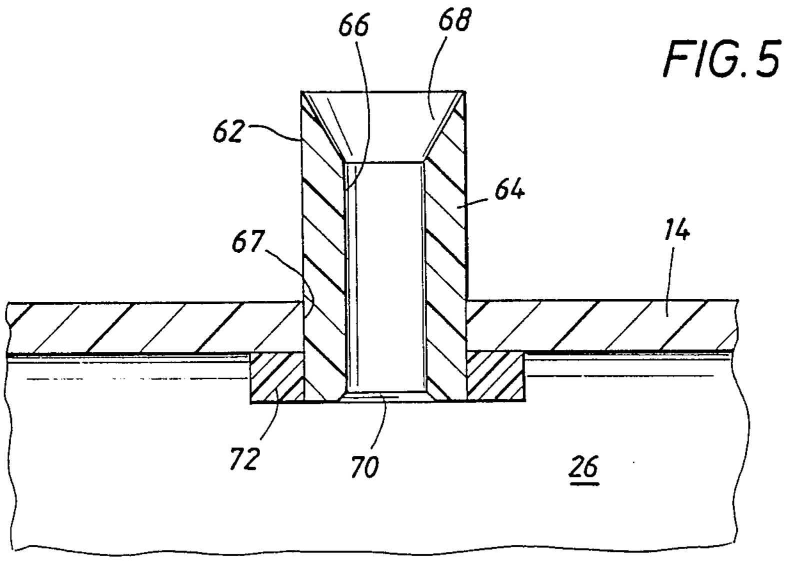
FIG. 5 is a sectional view of an air discharge fitting of the manifold assembly.
Figure 3:
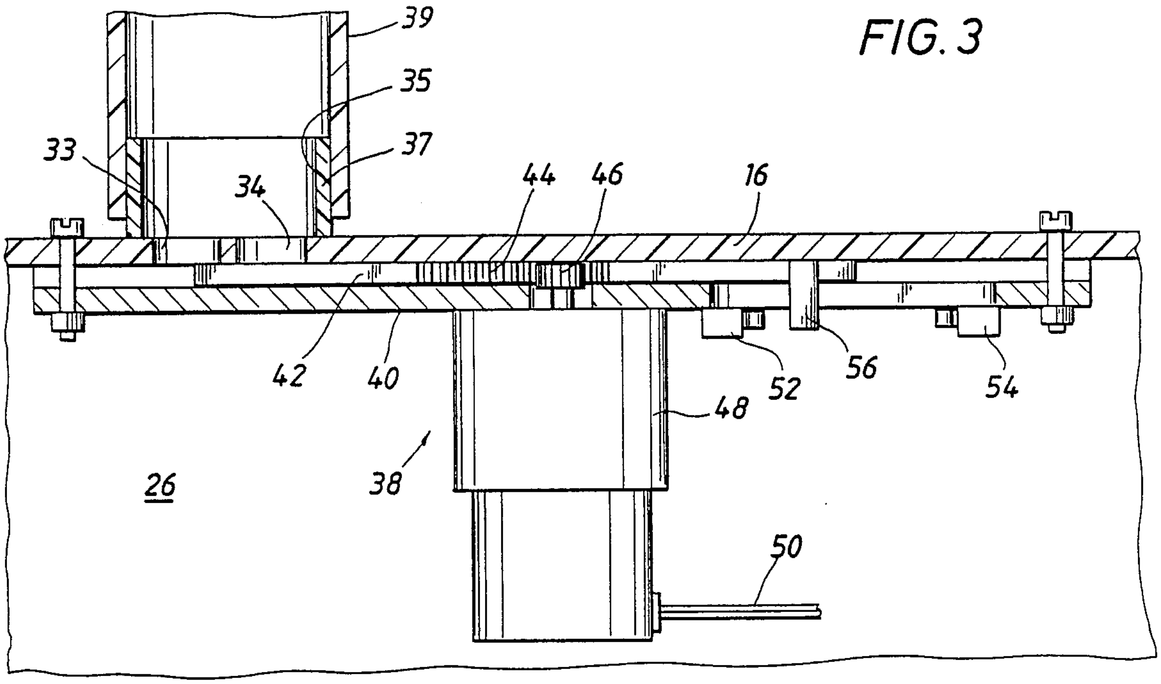
FIG. 3 is a fragmentary sectional view of the air supply manifold of FIGS. 1 and 2 illustrating the motor energized valve control system thereof.
Figure 4:
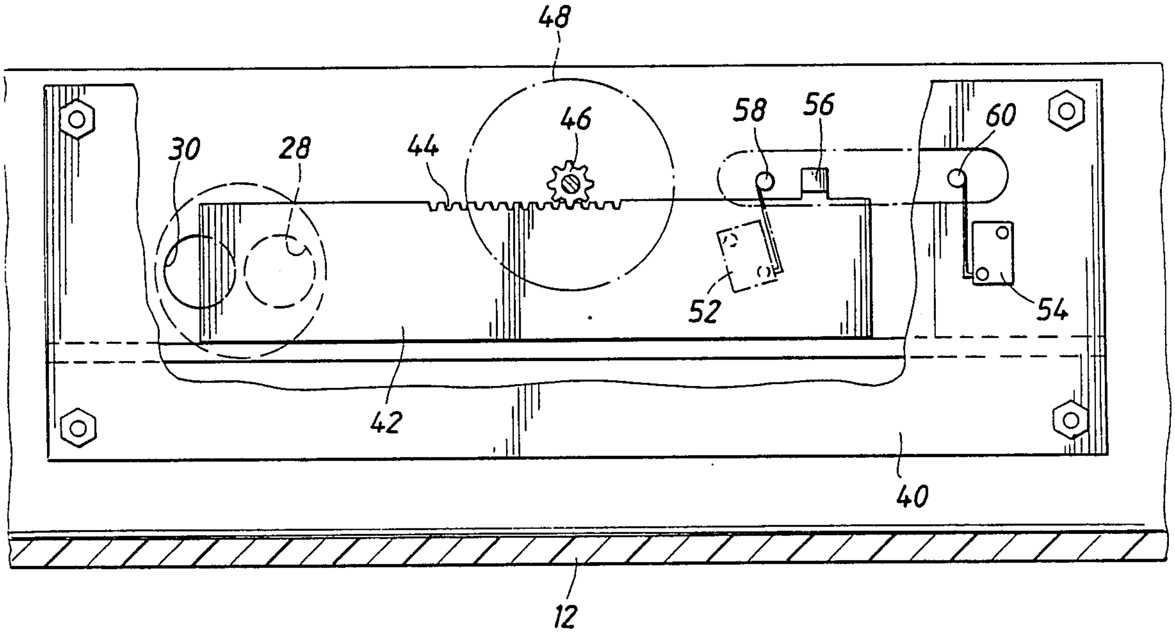
FIG. 4 is a fragmentary view of the rack and pinion drive system for the slide value of FIG. 3.

As shown in FIG. 5 by way of cross-sectional illustration the orifice fitting 62 will extend through an opening 68 in the wall structure 14 and forms air distribution passage 66 which, as indicated above, is of a desired dimension to distribute compressed air to a particular section of the air bed. To minimize noise as the air passes through the passage 66 the outlet of the passage is defined by a chamfer 68. The inlet opening of the passage 66 may also be chamfered as shown at 70. A retainer element 72 is disposed about the inlet extremity of the fitting and engages the inner surface of the manifold wall 14. If desired, the fitting and the retainer may be integrally formed from any suitable material such as a polymer, fiberglas, etc. The fitting is typically bonded to the wall structure of the manifold housing with any suitable bonding agent.

The patient is enabled to control operation of the motor 48 through manipulation of the control switch apparatus 51 and thus achieve opening or closing adjustment of the slide valve 42 for controlling the softness or firmness of the air bed. Through operation of the motor the patient may cause the slide valve to move toward its open or closed positions thereby uncovering or closing respective portions of the outlet apertures 32 and 34. Since the pressure of air supplied by the blower will typically remain constant, the position of the slide valve simply adjusts the volume of air flow from the manifold chamber thus controlling its pressure. Since the air cells of the air bed will be of the low air loss type, air and thus air pressure being supplied from the manifold chamber will maintain the respective air cells at predetermined pressures depending upon the position of the slide valve 42. Thus by manipulating only the slide valve the patient or those in assistance with the patient are enabled to simply and efficiently change the entire pressure of the air bed system thereby making it more or less firm as desired for patient comfort and for care of the patient. This is accomplished without changing the relationships of the effective air discharge ports or orifices of the air distribution system.

While the foregoing is directed to the preferred embodiment of the present invention, other and further embodiments of the invention may be devised without departing from the basic scope thereof, and the scope thereof is determined by the claims which follow.

What is claimed is:

1. An air distribution manifold assembly for air support convalescent beds having a plurality of air cells arranged in groups having one or more air cells in each group, said groups of air cells having differing internal pressures for support of respective sections of a patient's body, comprising:

(a) housing means adapted to be supported by a convalescent bed structure and forming an air chamber and air inlet means for connection to a source of pressurized air having a continuous supply at a predetermined maximum delivery pressure;

(b) air outlet means being provided in said housing means and being continuously open to permit continuous discharge of air from said air chamber;

(c) a plurality of air discharge connections extending from said housing means and adapted for connection with conduit means extending from said housing means to respective groups of said air cells of said air discharge connections, each of said air discharge connections having fixed orifice means of selected dimension for distribution of pressurized air to respective groups of said air cells for maintenance of predetermined pressure relationship of said groups of said air cells; and (d) valve means located at said air outlet means and being operable for varying the effective dimension of said air outlet means and thus the pressure of pressurized air in said air chamber for distribution through said fixed orifice means to respective groups of air cells, whereby the pressure relationships of said groups of air cells remain substantially constant as pressure is increased and decreased in said air chamber by selected positioning of said outlet valve means for overall control of air bed hardness and softness.

2. An air distribution manifold assembly as recited in claim 1 wherein:

said plurality of air discharge connections are each received by openings formed in said housing means.

3. An air distribution manifold assembly as recited in claim 2, wherein:

said fixed orifice means defines a diverging opening at the discharge side thereof for minimizing the development of air flow noise as air flows from said air chamber through respective ones of said fixed orifice means.

4. An air distribution manifold assembly for air support convalescent beds having a plurality of air cells having conduit means for supply of pressurized air thereto comprising:

(a) housing means adapted to be supported by a convalescent bed structure and forming an air chamber, said housing means also having air inlet means for connection to a source of pressurized air;

(b) elongated air outlet opening means;

(c) a plurality of air discharge connections extending from said housing means and adapted for connection with said conduit means, said air discharge connections each having fixed orifice means of selected dimension for distribution of pressurized air from said air chamber to said respective air cells in a manner establishing predetermined pressure relationships of said air cells; and (d) a slide valve located in registry with said elongated air outlet opening means and being operable for controlling the effective dimension of said elongated air outlet opening means to adjust the flow of air vented from said air chamber through said air outlet opening means to thus adjust the pressure of pressurized air in said air chamber for distribution through said fixed orifice means to said respective air cells whereby the pressure relationships of said air cells remains substantially constant as pressure is increased and decreased in said air chamber to selectively adjust the overall hardness of said air support convalescent bed to the comfort of the patient.

5. An air distribution manifold assembly as recited in claim 2, wherein said elongated air outlet opening means comprises:

(a) a pair of air outlet openings formed in side by side relation in a wall of said housing means; and (b) said slide valve being capable of closing part or all of both of said air outlet openings to control the flow of air through said air outlet openings from said air chamber.

6. An air distribution manifold assembly as recited in claim 4, wherein said valve means comprises:

(a) a valve support element being fixed to an inner side wall of said housing means and cooperating with said inner side wall to define an elongated slide valve recess; and (b) said slide valve being movably disposed within said slide valve recess and being movable to positions covering or uncovering said air outlet opening means.

7. An air distribution manifold assembly as recited in claim 6, wherein:

(a) said slide valve defines an elongated rack gear; and (b) pinion gear means being rotatably supported by said valve support element and being disposed in driving relation with said rack gear and being controllably driven for imparting air controlling movement to said slide valve.

8. An air distribution manifold assembly as recited in claim 7, including drive motor means for imparting driving rotation to said pinion gear means.

9. An air distribution manifold assembly as recited in claim 8 wherein said drive motor comprises:

(a) an electric motor having a power circuit extending therefrom for connection to a source of electrical energy and having a control circuit extending therefrom and being selectively operable by manual manipulation for directional control of said drive motor for imparting closing or opening movement to said slide valve.

10. An air distribution manifold assembly as recited in claim 9, wherein:

said slide valve and said drive motor are contained within said air chamber.

11. An air distribution manifold assembly as recited in claim 7, wherein:

(a) an electrically energized drive motor is connected in driving relation with said pinion gear means;

(b) limit means de-energizes said electric drive motor when said slide valve has moved to predetermined open and closed limits thereof.

12. An air distribution manifold assembly as recited in claim 11, wherein said limit means comprises:

(a) a pair of limit switches being supported by said valve support and providing a pair of switch arms;

(b) a stop projection extending from said slide valve and disposed for engagement with respective switch arms at predetermined positions of said slide valve.

13. An air distribution manifold assembly as recited in claim 12, wherein:

said limit switches are adjustable for selective adjustment of the respective open and closed stop positions of said slide valve.

14. In air support convalescent beds having a plurality of air cells to be maintained at predetermined pressure relationships and having the capability of adjusting the air pressure of said air cells while maintaining said pressure relationships substantially constant, the improvement comprising an air distribution manifold assembly including:

(a) housing means forming wall means adapted to be supported by the convalescent bed structure and forming an air chamber and air inlet means for connection to a source of pressurized air having a continuous supply of air at a predetermined maximum air supply pressure, said housing means having open air outlet means through which air is continuously vented from said air chamber;

(b) a plurality of air discharge connections extending from said housing means and adapted for connecting with conduit means extending from said housing means to respective air cells, said air discharge connections having fixed orifice means of selected dimension for distribution of pressurized air to respective air cells;

(c) outlet valve means located at said air outlet means and being operable for controlling the effective dimension of said air outlet means, thus controlling the volume of air continuously vented from said air chamber and controlling the pressure of air within said air chamber; and (d) valve control means being selectively actuated for opening or closing movement of said outlet valve means as desired for selective positioning of said outlet valve means.

15. An air distribution manifold assembly as recited in claim 14, wherein:

(a) said plurality of air discharge connections are each received by openings formed in said housing means; and (b) each of said fixed orifice means defines a diverging opening at the discharge side thereof for minimizing the development of air flow noise as air flows from said air chamber through respective ones of said fixed orifice means.

16. In air support convalescent beds having a plurality of air cells to be maintained at predetermined pressure relationships, the improvement comprising an air distribution manifold assembly including:

(a) a housing forming a wall structure and adapted to be supported by the convalescent bed structure and forming an air chamber therein and air inlet for connection to a source of pressurized air, said housing means forming wall means having elongated air outlet means defined by a plurality of closely spaced air outlet openings;

(b) a plurality of air discharge connections extending from said housing means and adapted for connection with conduit means extending from said housing means to respective air cells, said air discharge connections each having a fixed orifice of selected dimension for distribution of pressurized air to respective air cells;

(c) a motor operated slide valve located at said elongated air outlet means and being disposed in registry with said air outlet openings and being operable for closing selected portions of said air outlet openings to adjust the flow of air vented from said air chamber, thus controlling the pressure of air within said air chamber whereby the hardness of said air support convalescent bed is controlled for patient comfort while said predetermined pressure relationships of said air cells remain substantially constant; and (d) control means being selectively actuated for energizing said motor operated slide valve means for opening or closing movement thereof.

17. An air distribution manifold assembly as recited in claim 16, wherein said valve means comprises:

(a) a valve support element being fixed to an inner wall of said housing means and cooperating with said inner wall to define an elongated valve recess;

(b) an elongated slide valve being movably disposed within said slide valve recess and being movable to positions partially covering or uncovering said air outlet means, said slide valve defining a elongated rack gear along one surface thereof; and (c) pinion gear means being rotatably supported by said valve support means and being disposed in driving relation with said rack gear means and being controllably driven for imparting air controlling movement in slide valve means.

18. An air distribution manifold assembly as recited in claim 17, including:

(a) electric drive motor means for imparting driving rotation to said pinion gear means and having a power circuit extending therefrom and being selectively operable by manual manipulation for directional control of said drive motor for imparting closing or opening movement to said slide valve.

(b) said slide valve and said electric drive motor are contained within said air chamber; and (c) limit means de-energizes said electric drive motor when said slide valve reaches open and closed limits thereof.

19. An air distribution manifold assembly as recited in claim 18, wherein said limit means comprises:

(a) a pair of limit switches being supported by said valve support and providing a pair of switch arms; and (b) a stop projection extending from said slide valve and disposed for engagement with respective switch arms at predetermined positions of said slide valve.

20. An air distribution manifold assembly as recited in claim 19, wherein:

said limit switches are adjustable for selective adjustment of the respective open and closed stop positions of said slide valve.

* * * * *